(12) United States Patent
Bolich

(10) Patent No.: US 9,734,448 B2
(45) Date of Patent: Aug. 15, 2017

(54) SOFTWARE APPLICATION FOR MANAGING A COLLECTION OF ROBOT REPAIRING RESOURCES FOR A TECHNICIAN

(71) Applicant: Shawn Patrick Bolich, Cupertino, CA (US)

(72) Inventor: Shawn Patrick Bolich, Cupertino, CA (US)

(*) Notice: Subject to any disclaimer, the term of this patent is extended or adjusted under 35 U.S.C. 154(b) by 442 days.

(21) Appl. No.: 14/462,872

(22) Filed: Aug. 19, 2014

(65) Prior Publication Data

US 2015/0149392 A1 May 28, 2015

Related U.S. Application Data

(60) Provisional application No. 61/909,554, filed on Nov. 27, 2013, provisional application No. 61/949,392, filed on Mar. 7, 2014.

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06N 3/02 | (2006.01) |
| G06N 5/02 | (2006.01) |
| G06Q 10/00 | (2012.01) |

(52) U.S. Cl.
CPC .............. *G06N 5/02* (2013.01); *G06Q 10/20* (2013.01)

(58) Field of Classification Search
CPC .. G06E 1/00; G06E 3/00; G06F 15/18; G06G 7/00; G06N 3/02
See application file for complete search history.

(56) References Cited

U.S. PATENT DOCUMENTS

| | | | | |
|---|---|---|---|---|
| 7,302,608 | B1* | 11/2007 | Acharya | G06F 11/2041 714/13 |
| 2007/0220308 | A1* | 9/2007 | Yeung | G06F 11/1469 714/5.1 |
| 2009/0012878 | A1* | 1/2009 | Tedesco | G06Q 30/06 705/26.41 |

(Continued)

OTHER PUBLICATIONS

'WRAPLE: The Weighted Repair Assistance Prografil Learning Extension': Simpson, 1986, IEEE, 0740-7475-86/0400.*

*Primary Examiner* — Stanley K Hill
*Assistant Examiner* — Peter Coughlan

(57) ABSTRACT

A software application that is able to manage a collection of robot repairing resources can be used to assist technicians in repairing and solving hardware or software malfunctions within an electro-mechanical robot. The software application is able to simultaneous monitor multiple different electro-mechanical robots by receiving diagnostic information from them. The software application can identify a malfunction within one of the electro-mechanical robots by comparing its diagnostic information against a set of robot repair manuals. The software application will then select an optimal AI algorithm that has the best chance of repairing the hardware or software malfunction. The software application continues by implementing the optimal AI algorithm with a set of cloud accessible robot repairing applications, a technician's intervention, or a combination thereof.

13 Claims, 13 Drawing Sheets

(56) References Cited

U.S. PATENT DOCUMENTS

| | | | |
|---|---|---|---|
| 2009/0262741 A1* | 10/2009 | Jungck | H04L 29/12066 370/392 |
| 2012/0152688 A1* | 6/2012 | Lee | F16D 48/02 192/85.63 |
| 2012/0303270 A1* | 11/2012 | Su | G01C 21/3415 701/431 |
| 2013/0046624 A1* | 2/2013 | Calman | G06Q 30/0259 705/14.53 |
| 2013/0189028 A1* | 7/2013 | Gershenfeld | F16B 3/00 403/345 |
| 2013/0283256 A1* | 10/2013 | Proud | H01F 38/14 717/172 |

* cited by examiner

SOFTWARE APPLICATION FOR MANAGING A COLLECTION OF ROBOT REPAIRING RESOURCES FOR A TECHNICIAN

The current application claims a priority to the U.S. Provisional Patent application Ser. No. 61/909,554 filed on Nov. 27, 2013 and the U.S. Provisional Patent application Ser. No. 61/949,392 filed on Mar. 7, 2014.

FIELD OF THE INVENTION

The present invention generally relates to a cloud based software application that steers technicians to the quickly correct manuals and effortlessly educates technicians in order to repair different models of robots, programming codes, parameters, management, and mechanics.

BACKGROUND OF THE INVENTION

Robot repairs can be difficult for any technician because of the vast range of robots that are on the market. Most technicians do not have the immediate resource to access the vast amount of data on any particular robot repair. Therefore, an objective of the present invention to provide a robot repair application and software which assists technicians in repairs of different model robots, programming codes, parameters, management, and mechanics. More specifically, the present invention is used to provide storage of repair specifications, references for electronic components, virus protection, monitoring services for the robotic machines, management capabilities, design references, data loss integration, required algorithms, required parameters, programmable logic controllers, mechanics, hydraulic specifications, required pneumatic specifications, programming codes, required parts, and required software.

DETAILED DESCRIPTION OF THE INVENTION

All illustrations of the drawings are for the purpose of describing selected versions of the present invention and are not intended to limit the scope of the present invention.

Figure 1:
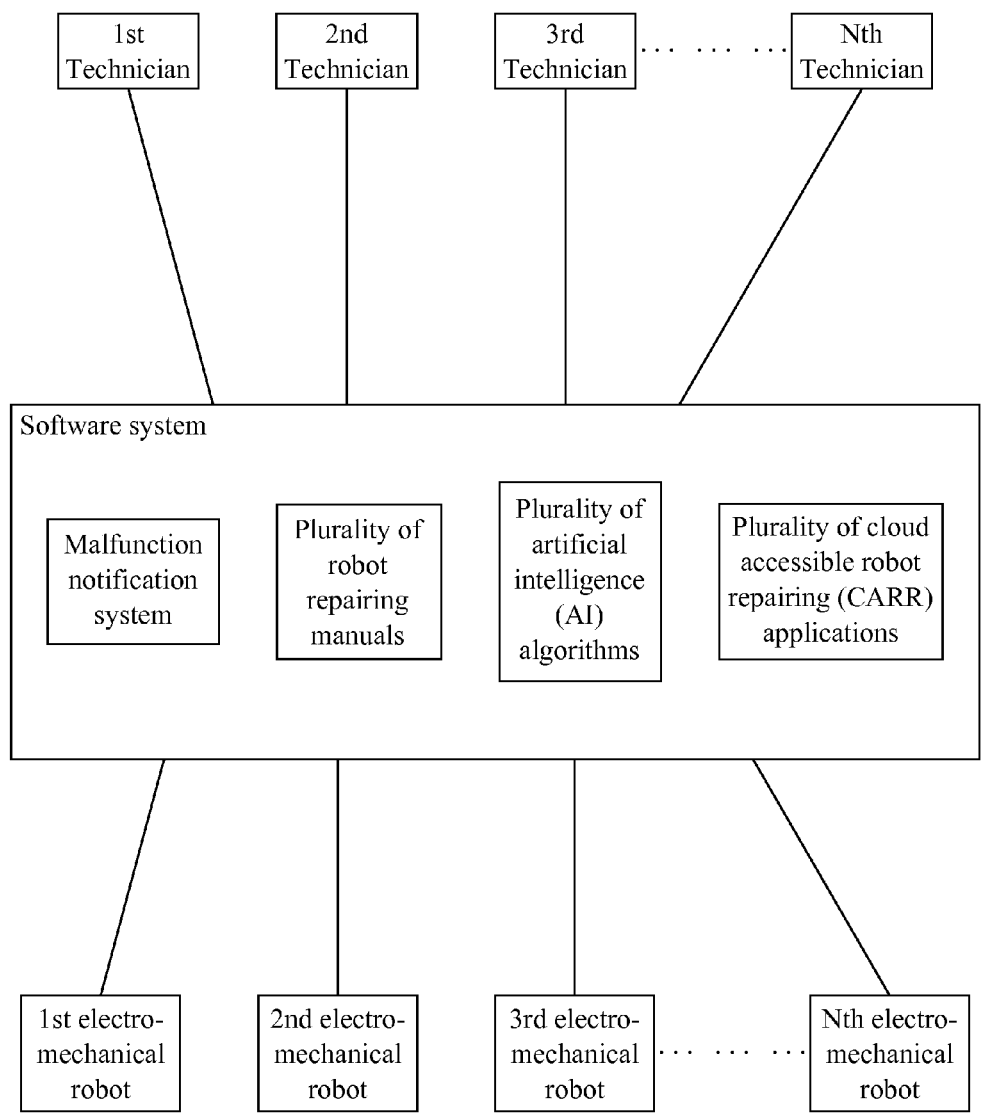
FIG. 1 is a block diagram illustrating the overall interaction between the technicians and the electro-mechanical robots through the present invention.

As can be seen in FIG. 1, the present invention is a cloud-based software application that manages a collection of robot repairing resources for a technician. The present invention is used to oversee a plurality of electro-mechanical robots, which are autonomous or semi-autonomous machines that are guided by a computer program or electronic circuitry. The collection of robot repairing resources provided by the present invention includes a plurality of robot repairing manuals, a plurality of artificial intelligence (AI) algorithms, and a plurality of cloud accessible robot repairing (CARR) applications. The plurality of robot repairing manuals allows the present invention to determine what kind of hardware or software malfunction may be afflicting a specific robot. In addition, the plurality of robot repair manuals contains technical specifications on a variety of electro-mechanical robots. The plurality of AI algorithms provides the present invention with different troubleshooting processes on how to repair a variety of hardware or software malfunctions within an electro-mechanical robot. The plurality of AI algorithms will typically suggest fixing the hardware or software malfunction by implementing one or more of the plurality of CARR applications, which can be autonomously executed by the present invention or can be provided to be implemented by a technician.

The plurality of CARR applications includes, but is not limited to, a set of software applications that are related to the following topics: computer-aided design (CAD) references; wiring diagrams; hydraulics; global positioning system (GPS) location; internal temperature; pneumatics; fluidics; software asset management (SAM) parameters; circuitry; virus protection; programming languages (such as C++); algorithms; configurable network computing (CNC) systems such as components, interrelated functions, and capabilities; electronic components; industrial programmable logic controllers (PLCs); relays; contactors; switches; time delays; sequencers; timers; ladder diagrams; codes and standards (such as NEC, NEMA, etc.); Karnaugh maps; control logics; cloud computing; Mosso Elastic Cloud; multicast address allocation server (MAAS); software as a service (SAAS); Xen Hypervision; manufacturers repair modules; and manufacturers repair manuals. More specifically, the plurality of CARR applications for software-related errors includes, but is not limited to, virus protection, software updates, parameters for robotics, autonomous navigation, mobile localization and navigation, perception software, localization mapping, camera calibration, stability software, STARMAC, synchronic drive, mobile robot control algorithms, time of flight ranging, triangulation active ranging, and Photosynth.

Figure 2A:
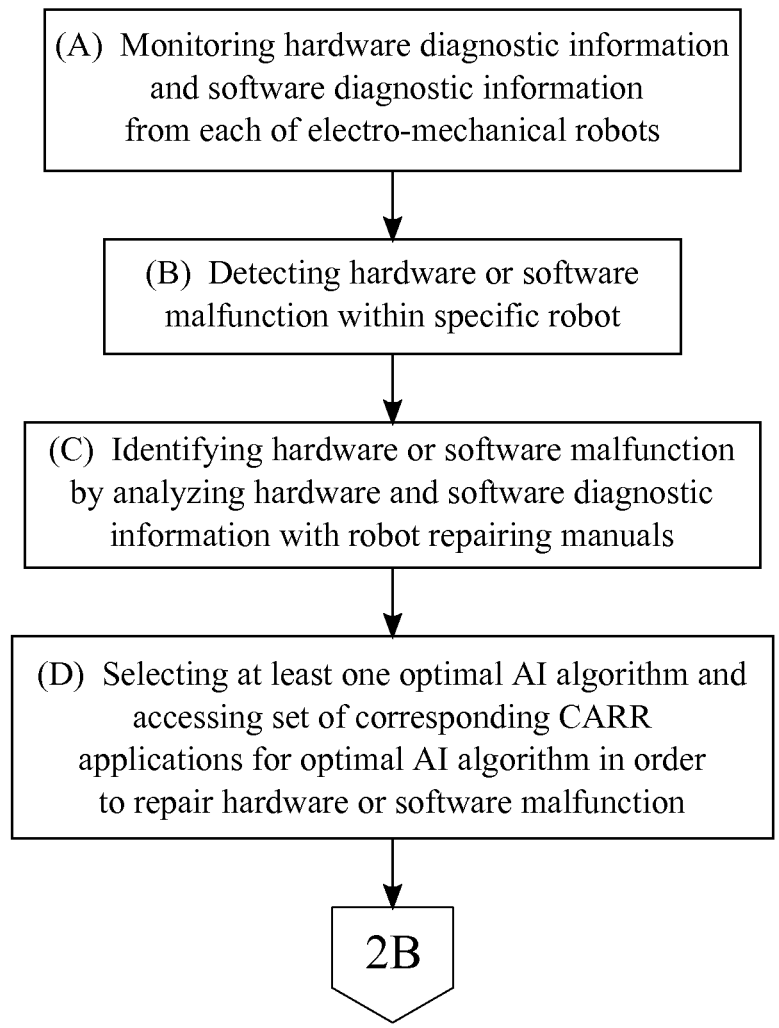
FIG. 2A is a flow chart illustrating a general process that is followed by the present invention in order to repair electro-mechanical robots.
Figure 2B:
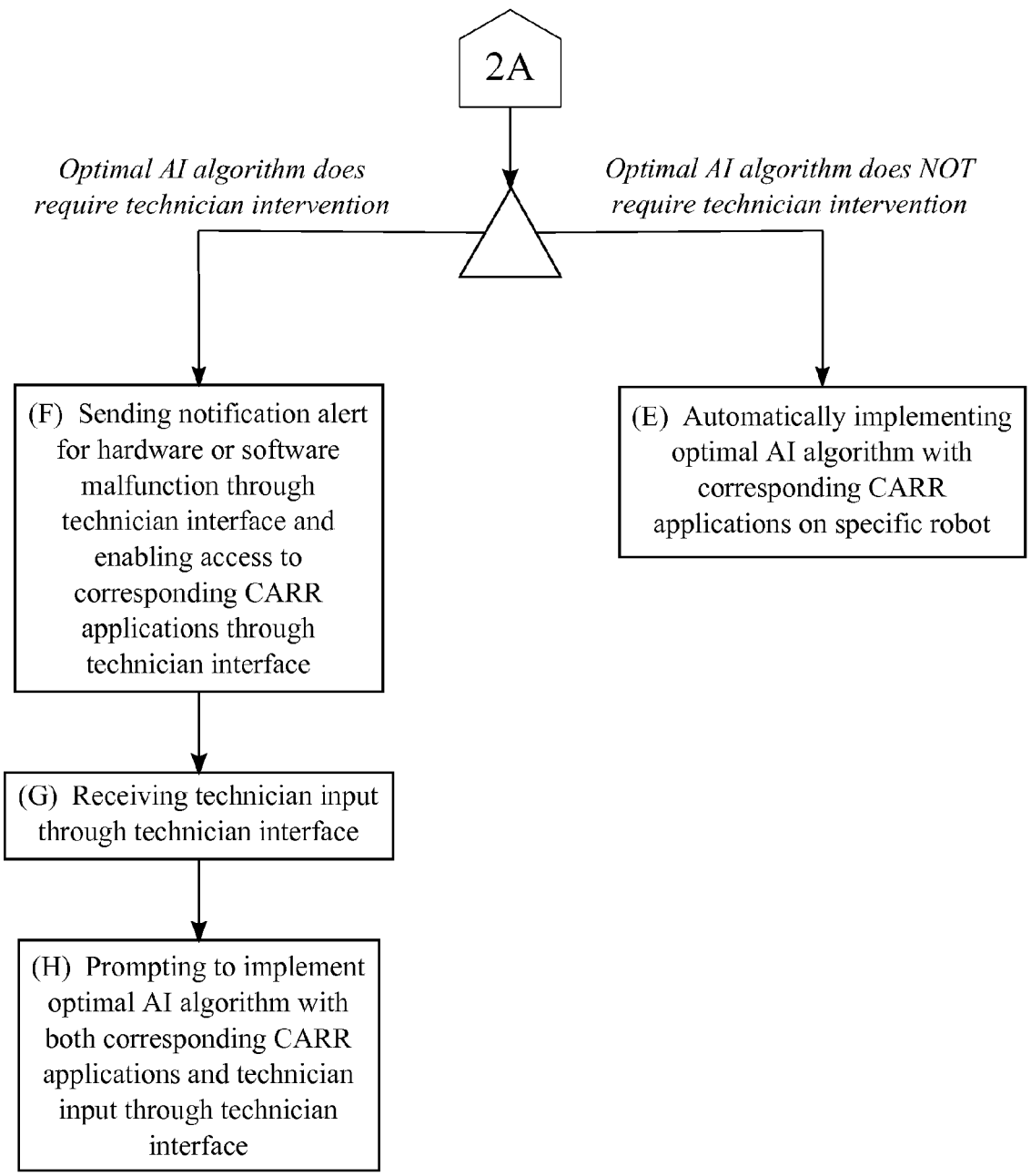
FIG. 2B is a continuation of the flow chart shown in FIG. 2A.

The prevent invention follows a general process shown in FIGS. 2A and 2B, which allows a technician to take full advantage of the collection of robot repairing resources. The general process begins by monitoring hardware diagnostic information and software diagnostic information from each of the electro-mechanical robots so that the present invention can detect when one of the electro-mechanical robots do have a hardware malfunction or a software malfunction. The hardware diagnostic information is data from a specific robot describing the current status of its electro-mechanical systems. The software diagnostic information is data from a specific robot describing the current status of its software programming. If a hardware malfunction or a software malfunction is detected for a specific robot, the general process continues by identifying the hardware malfunction or the software malfunction by analyzing the hardware diagnostic information and the software diagnostic information with reference to the robot repair manuals, which have troubleshooting procedures to interpret the incoming diagnostic information. The general process continues by selecting from the plurality of AI algorithms at least one optimal AI algorithm that is able to best repair the hardware malfunction or the software malfunction for the specific robot. In some instances, the software application may choose multiple optimal AI algorithms in order to repair the hardware malfunction or the software malfunction. The optimal AI algorithm requires a set of corresponding CARR applications that assist in repairing the specific robot. If the optimal AI algorithm does not require technician intervention and is able to autonomously repair the hardware or software malfunction, then the software application will implement the optimal AI algorithms with said corresponding CARR applications on the specific robot.

The present invention monitors, but is not limited to, diagnostic information from each electro-mechanical robot that are related to the following topics: surrounding environment; internal temperature; motor speed; sound amplitude; battery voltage; light intensity; GPS location; error of sensors accuracy; cameras operation; common-pool resource (CPR); heading sensors; circuit boards; circuitry; electronics; ground beacons; hydraulics sensors; pneumatic sensors; programming; active ranging; time of flight sensors; motion and speed; optics; edge detectors; interrogate for errors in algorithms; solenoids; hydraulic pump sensors; pneumatics pumps sensors; pressure sensors; bionic applications; preexisting sensors; and refer to the electronics: circuitry, hydraulics, pneumatics, or programming in need of repair.

As can be seen FIG. 2B, the general process follows a different series of steps if the optimal AI algorithm does require technician intervention such as to repair something mechanical on the specific robot. The software application will send a notification alert for the hardware malfunction or the software malfunction through a technician interface, which makes a technician aware of the malfunction on the specific robot. The technician interface is a virtual portal that allows the technician to interact with the software application. The software application will also enable access to the corresponding CARR applications through the technician interface so that the technician is able to readily and fully utilize the corresponding CARR applications. The software application will wait and receive a technician input through the technician interface. The technician input is any kind of technician intervention that is required for the software application to complete repairs on the specific robot. Finally, the software application will prompt the technician to implement the optimal AI algorithm with both the corresponding CARR applications and the technician input through the technician interface so that the technician takes over repairing the specific robot.

Figure 3:
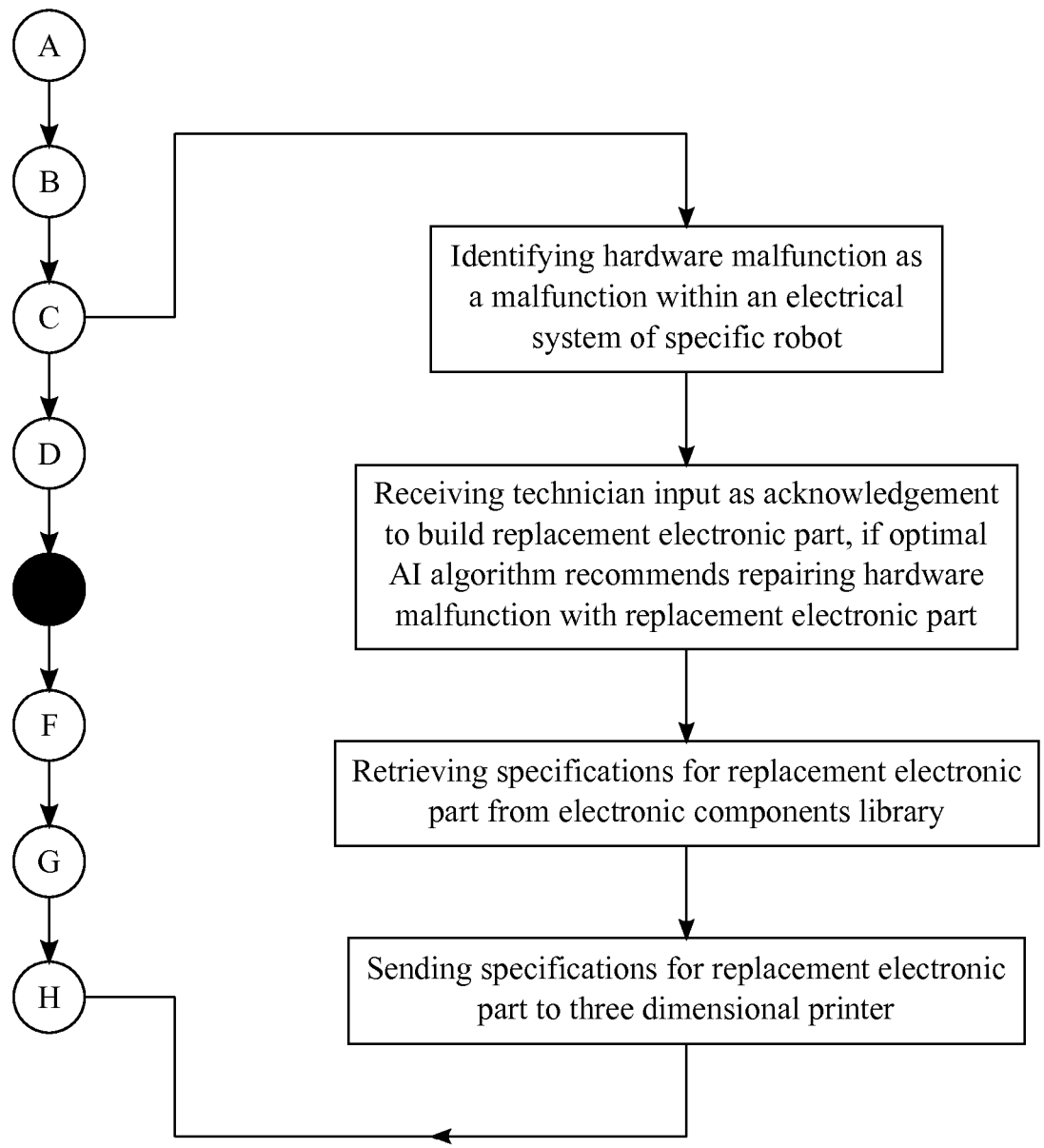
FIG. 3 is a flow chart illustrating a specific scenario of the general process, wherein an electro-mechanical robot has a hardware malfunction within its electrical systems.

A specific scenario for the general process occurs when a hardware malfunction within the specific robot is identified as a malfunction with the electrical system of the specific robot. This is illustrated in FIG. 3. If the optimal AI algorithm recommends repairing hardware malfunction with a replacement electronic part, then the software application will need the technician input to be an acknowledgment to build a replacement electronic part. The software application will next retrieve the technical specifications of the replacement electronic part from an electronic components library, which is provided as one of the plurality of CARR applications. The electronic components library should include technical specifications for a variety of common electronic parts that are typically used in electro-mechanical robots. The software application will then send the technical specifications of the replacement electronic part to a three-dimensional printer, which physically builds the replacement electronic part according to its technical specifications. The technician can then retrieve the replacement electronic part from the three-dimensional printer, install the replacement electronic part on the specific robot, and repair the hardware malfunction.

In the preferred embodiment, the present invention is used to monitor and to repair the following electronic components: solenoids, Traics, rectifiers, operational amplifier, resistors, integrated circuits, capacitors, solid state relay (SSR), inductors, mini-dip integrated circuits, diodes, solid state power sources, transistors, thermistors, industrial programmable logic controllers, and in-control circuits. Other electrical systems to be typically monitored by a toroidal transformer includes, but is not limited to, direct current (DC) motors, alternating current (AC) motors, logic switch settings, automatic stepping motors, and AC synchronous motors into a monitored control integrated circuit.

Figure 4:
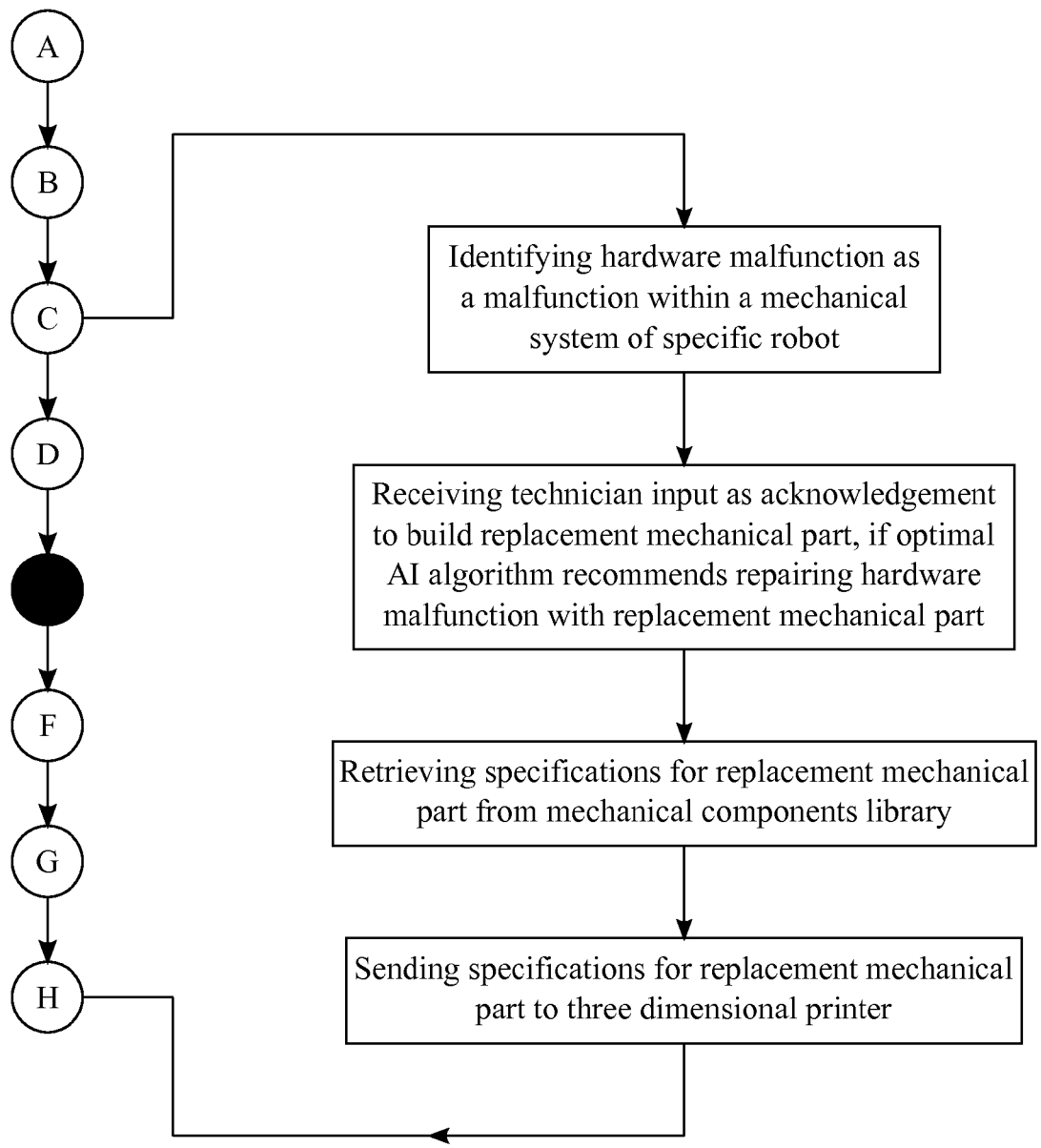
FIG. 4 is a flow chart illustrating a specific scenario of the general process, wherein an electro-mechanical robot has a hardware malfunction within its mechanical systems.

Similar to the previous scenario, another specific scenario for the general process occurs when a hardware malfunction within the specific robot is identified as a malfunction with the mechanical system of the specific robot. This is illustrated in FIG. 4. For example, the mechanical system could refer to a hydraulic system, a pneumatic system, or a fluidic system with the specific robot. Typically, pressure probes within the specific robot are used to monitor the hydraulic system and the pneumatic system. If the optimal AI algorithm recommends repairing a hardware malfunction with a replacement mechanical part, then software application will need the technician input to be an acknowledgment to build a replacement mechanical part. The software application will next retrieve the technical specifications of the replacement mechanical part from a mechanical components library, which is provided as another one of the plurality of CARR applications. Similar to the electronic components library, the mechanical components library should include technical specifications for a variety of common mechanical parts that are typically used in electro-mechanical robots. The software application will then send the technical specifications of the replacement mechanical part to a three-dimensional printer, which physically builds the replacement mechanical part according to its technical specifications. The technician can then retrieve the replacement mechanical part from the three-dimensional printer, install the replacement mechanical part on the specific robot, and repair the hardware malfunction.

In some embodiments of the present invention, the software application could use additive manufacturing (AM) instead of three-dimensional printing to build either the replacement electronic part or the replacement mechanical part.

Figure 5A:
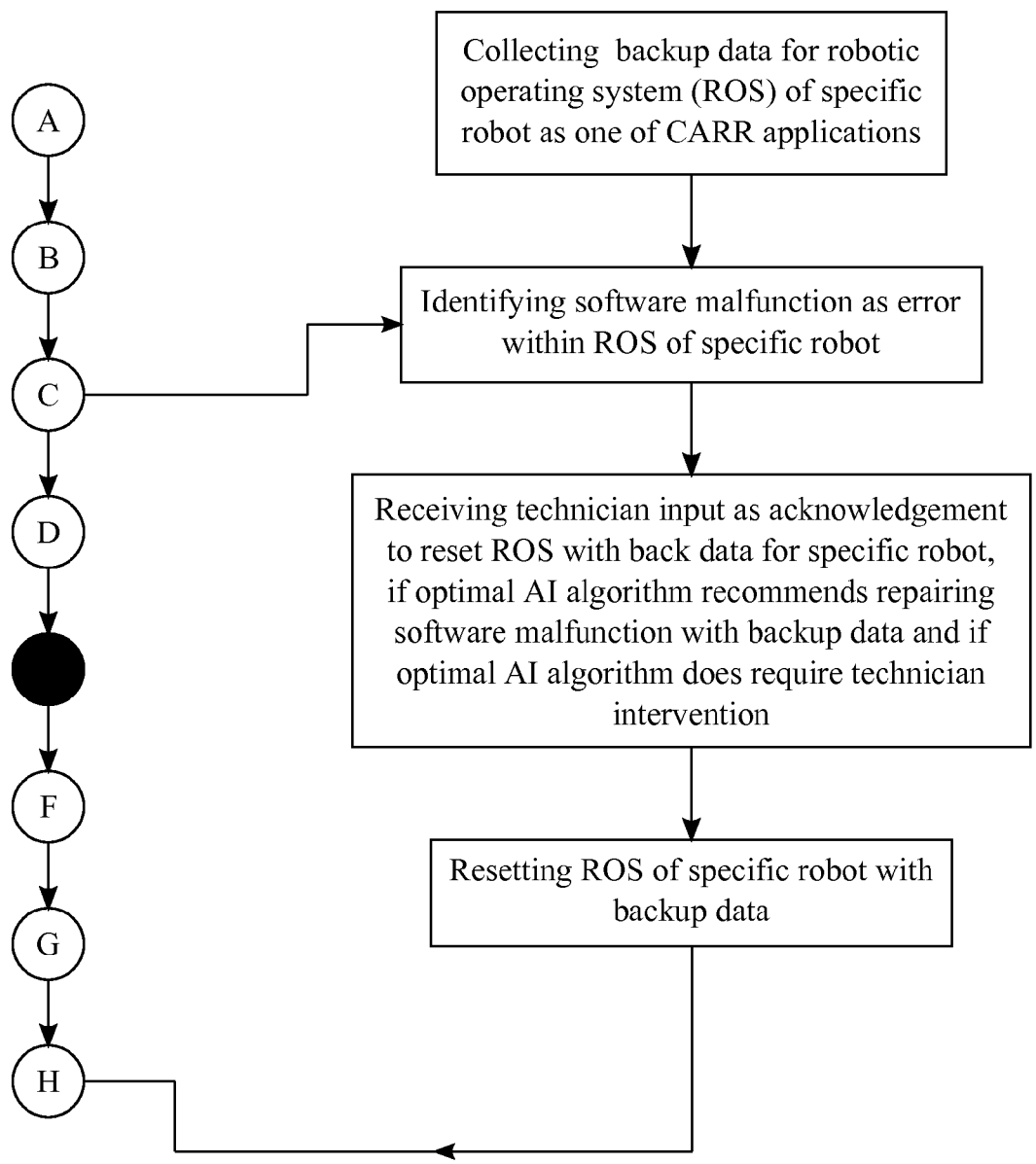
FIG. 5A is a flow chart illustrating a specific scenario of the general process, wherein an electro-mechanical robot has a software malfunction with its operating system, and the present invention does require technician intervention to repair the software malfunction with backup data.
Figure 5B:
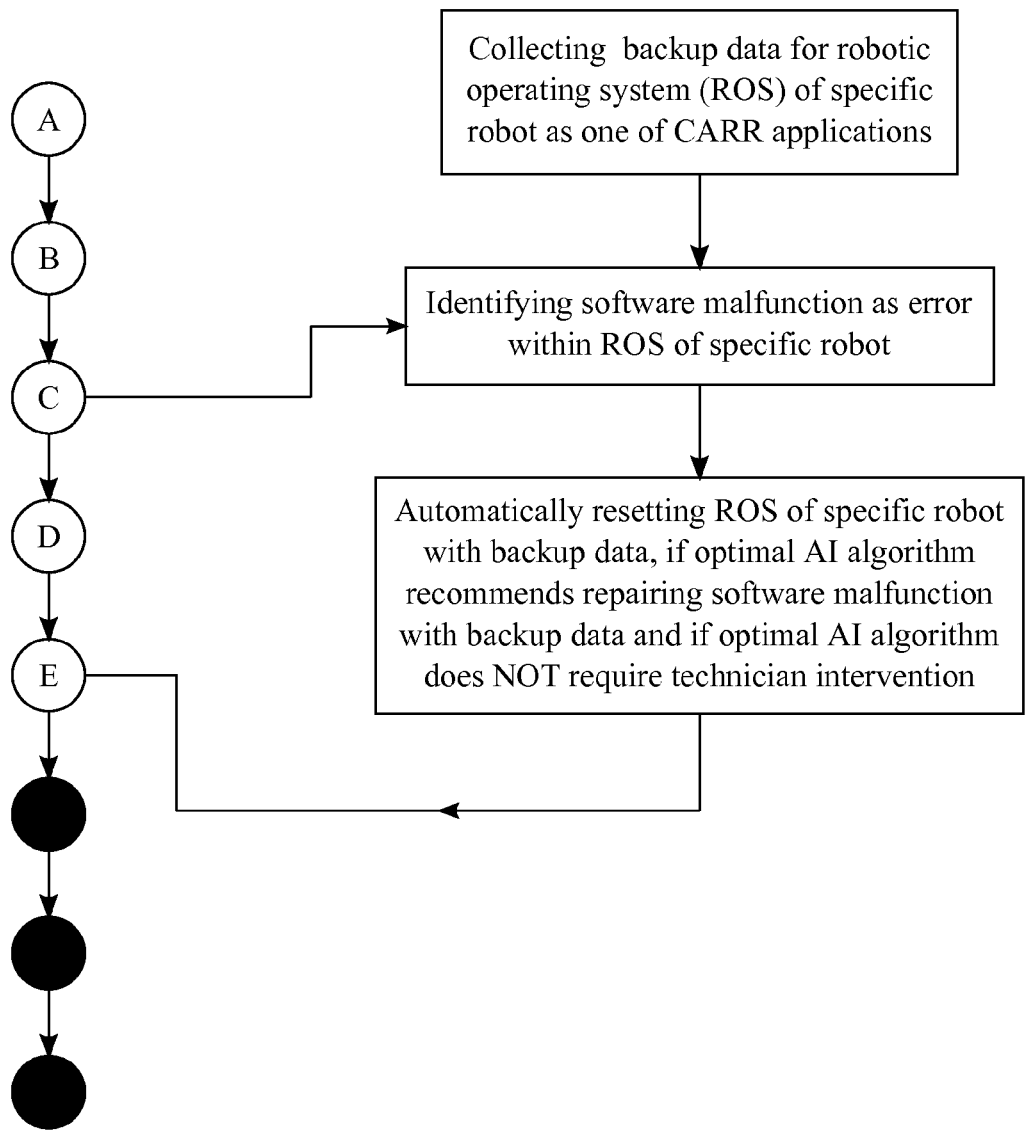
FIG. 5B is a flow chart illustrating a specific scenario of the general process, wherein an electro-mechanical robot has a software malfunction with its operating system, and the present invention does not require technician intervention to repair the software malfunction with backup data.

A specific scenario of the general process can occur when a software malfunction is identified as an error within the robotic operating system (ROS) of the specific robot, which is illustrated in FIGS. 5A and 5B. The ROS is a collection of software frameworks that control and manage the different functional aspects of an electro-mechanical robot. The error within the ROS could prevent or limit one of those functional aspects from working properly. In order to prepare for an error within the ROS, the software application will collect backup data for the ROS of the specific robot as one of the CARR applications so that the software application has a readily-available, working version of the ROS until the software malfunction occurs for the specific robot. Once the software application detects and identifies the software malfunction, the software application is able to repair the software malfunction with the backup data by resetting the ROS of the specific robot with the backup data, which restores the ROS of the specific robot to its previous working version. Depending on the procedural steps of the optimal AI algorithm, the software application can reset the ROS of the specific robot either with or without a technician's permission. As can be seen FIG. 5A, if the optimal AI algorithm recommends repairing the software malfunction with the backup data and if the optimal AI algorithm does require technician intervention, then the software application would need to receive the technician input as an acknowledgement to reset the ROS for the specific robot with backup data. For example, the optimal AI algorithm could require technician intervention because resetting the ROS with the backup data could seriously compromise other stable aspects of the ROS. As can be alternatively seen in FIG. 5B, if the optimal AI algorithm recommends repairing the software malfunction with the backup data and if the optimal AI algorithm does not require technician intervention, then the software application can automatically reset the ROS of the specific robot with the backup data. For example, the optimal AI algorithm could not require technician intervention because not resetting the ROS with the backup data within a certain period of time could lead to catastrophic failure for the specific robot.

Figure 6A:
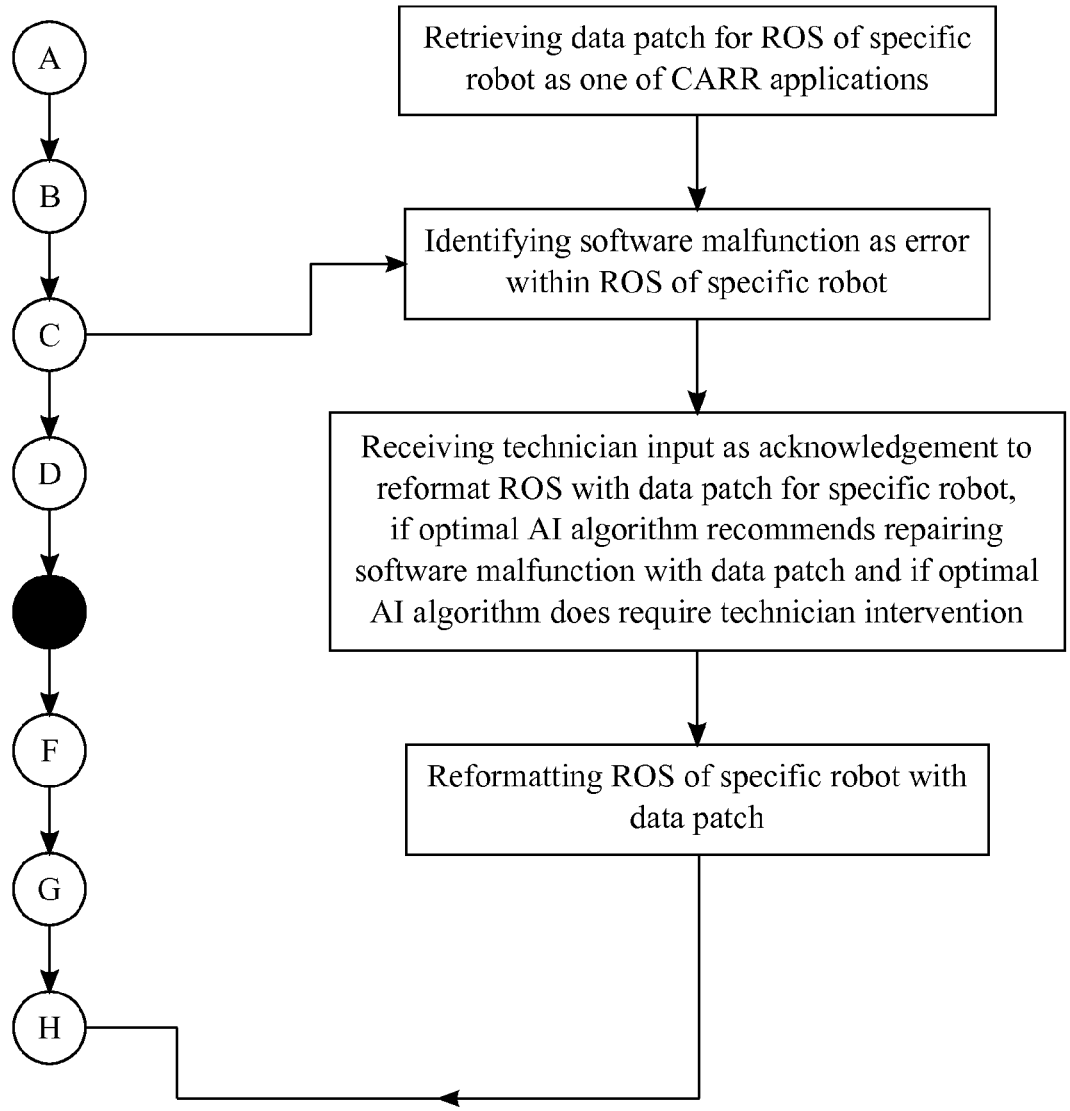
FIG. 6A is a flow chart illustrating a specific scenario of the general process, wherein an electro-mechanical robot has a software malfunction with its operating system, and the present invention does require technician intervention to repair the software malfunction with a data patch.
Figure 6B:
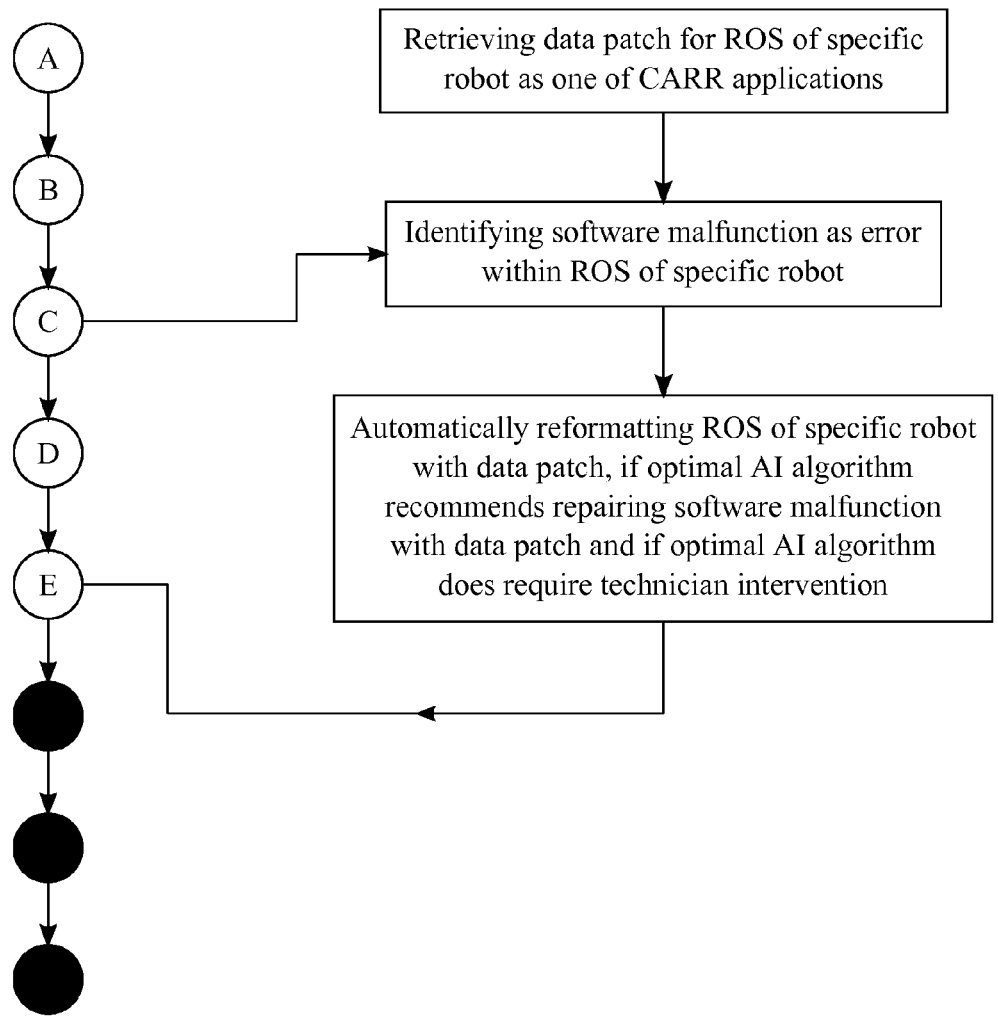
FIG. 6B is a flow chart illustrating a specific scenario of the general process, wherein an electro-mechanical robot has a software malfunction with its operating system, and the present invention does not require technician intervention to repair the software malfunction a data patch.

A different scenario of the general process can occur when a software malfunction is identified as an error within the ROS of the specific robot, which is illustrated in FIGS. 6A and 6B. For this scenario, the software application will retrieve a data patch for the ROS of the specific robot as one of the CARR applications. The data patch is a piece of code that is integrated into the ROS to fix the software malfunction. Once the software application detects and identifies the software malfunction, the software application is able to repair the software malfunction with a data patch, which can be integrated into the ROS of the specific robot and can correct the error within the ROS. Depending on the procedural steps of the optimal AI algorithm, the software application can reformat the ROS of the specific robot either with or without a technician's permission. As can be seen in FIG. 6A, if the optimal AI algorithm recommends repairing the software malfunction with the data patch and if the optimal AI algorithm does require technician intervention, then the software application would need to receive the technician input as an acknowledgement to reformat the ROS for the specific robot with the data patch. For example, the optimal AI algorithm could require technician intervention because reformatting the ROS with the data patch could seriously compromise other stable aspects of the ROS. As can be alternatively seen FIG. 6B, if the optimal AI algorithm recommends repairing the software malfunction with the data patch and if the optimal AI algorithm does not require technician intervention, then the software application can automatically reformat the ROS of the specific robot with the data patch. For example, the optimal AI algorithm could not require technician intervention because not reformatting the ROS with the data patch within a certain period of time could lead to catastrophic failure for the specific robot.

Figure 7:
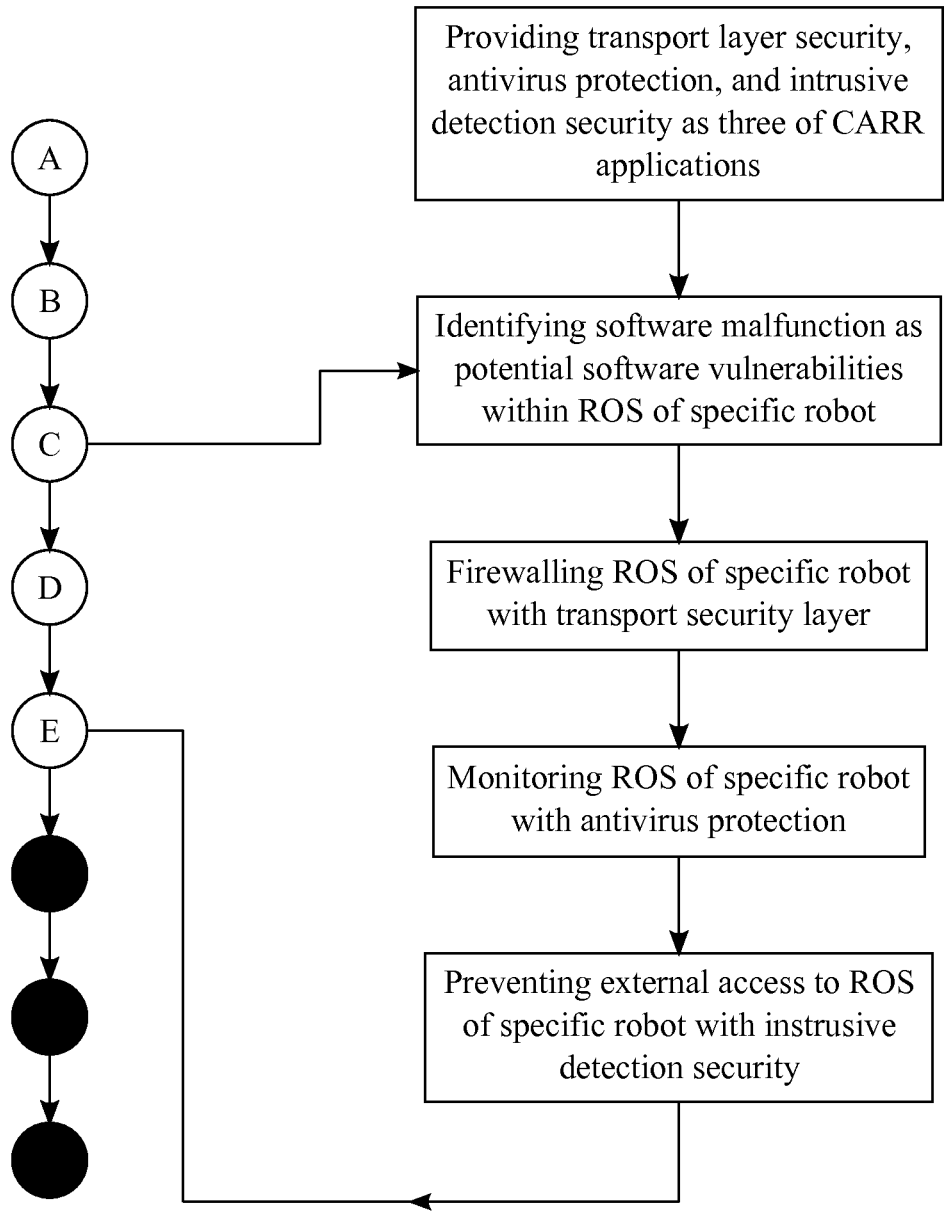
FIG. 7 is a flow chart illustrating a specific scenario of the general process, wherein an electro-mechanical robot has potential vulnerabilities in its operating system in the form of a software malfunction, and the present invention attempts to secure those potential vulnerabilities.

Another specific scenario of the general process can occur when a software malfunction is identified as potential software vulnerabilities with the ROS of the specific robot, which is illustrated in FIG. 7. These potential software vulnerabilities can lead to attacks by malware on the ROS of the specific robot. Once the software application identifies and detects the software malfunction, then the software application is able to shore up these potential software vulnerabilities by implementing three of the CARR applications, which include transport layer security, antivirus protection, and intrusive detection security. The optimal AI algorithm can recommend using any of those three CARR applications or a combination thereof. The transport layer security is used to firewall the ROS of the specific robot, which allows the ROS of the specific robot to safely communicate over the Internet. The antivirus protection is used to monitor the ROS of the specific robot so that a computer virus can be detected and removed from the ROS of the specific robot. The intrusion detection system is used to prevent external access to the ROS of the specific robot so that the ROS of the specific robot is protected from external malware attacks.

In some embodiments, management will be based off of ROS and real-time operating system (RTOS) of an electro-mechanical robot. The ROS and RTOS will integrate into a rich site summary (RSS) syndication portal, which will maintain individual robot task parameters and backup algorithms. The RSS syndication portal will back up the individual robots identity and related specifications. The present invention integrates AI algorithms to complete the function related to the following: management operations during repair; security monitoring application service provider; electronic library and automatic information recall; supporting software (such as default algorithms); data inventory; data security (such as intrusive detection security); data classification; hydraulics; pneumatics; fluidics; virus protection robust security; security assertions markup language (SAML); symbolic optimal assembly program (SOAP) for customers service; OAuth secure transport layer security;

defense in-depth; mechanical drawings specifications; mechanical autonomous algorithms; calibration manipulators; sensors; wiring diagram (FTP); wiring diagrams autonomous algorithms; AI algorithms; manual camera operations; real time operating systems (RTOS); autonomous navigation technology (ANT); manual navigation technology; battery monitoring; autonomous recharging algorithms; manuals (notify alert) FTP; input specifications for 3D printing capabilities; utilizing Jetty's; and utilizing wireless internet technology.

Figure 8:
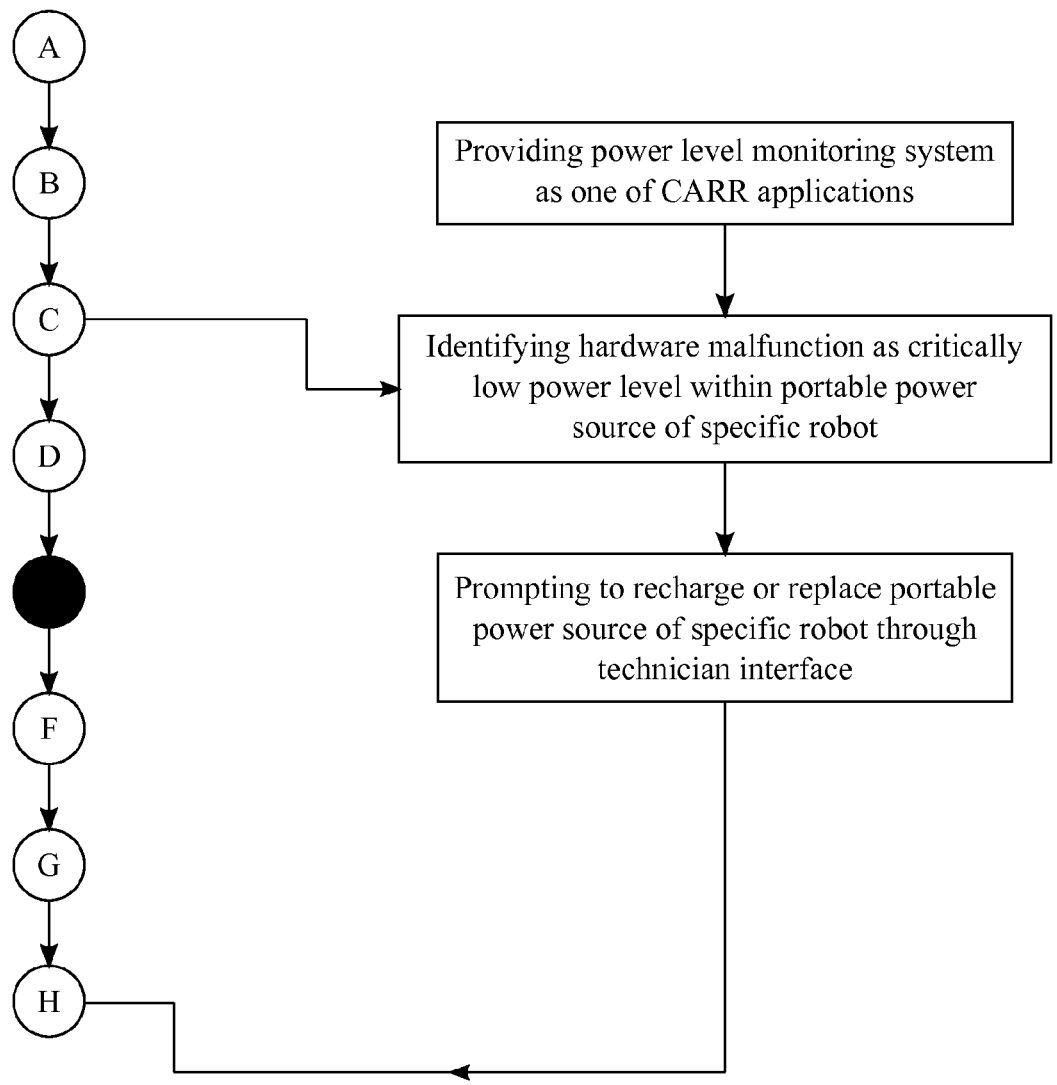
FIG. 8 is a flow chart illustrating a specific scenario of the general process, wherein an electro-mechanical robot being at a critically low power level is considered a hardware malfunction.

Another specific scenario of the general process can occur when a hardware malfunction is identified as a critically low power level within a portable power source of the specific robot. This is illustrated in FIG. 8. An electro-mechanical robot is typically autonomous and, thus, requires a portable power source because the electro-mechanical robot cannot physically be tethered to an external powering system. The software application is able to identify the hardware malfunction as a critically low power level by using a power level monitoring system, which is available as one of the CARR applications. The power level monitoring system allows the software application to continuously monitor the portable power source of the specific robot. Once the power level monitoring system reports a critically low power level, the software application will prompt to recharge or replace the portable power source of the specific robot through the technician interface so that the technician knows that the portable power source needs to be immediately recharged or replaced.

Figure 9A:
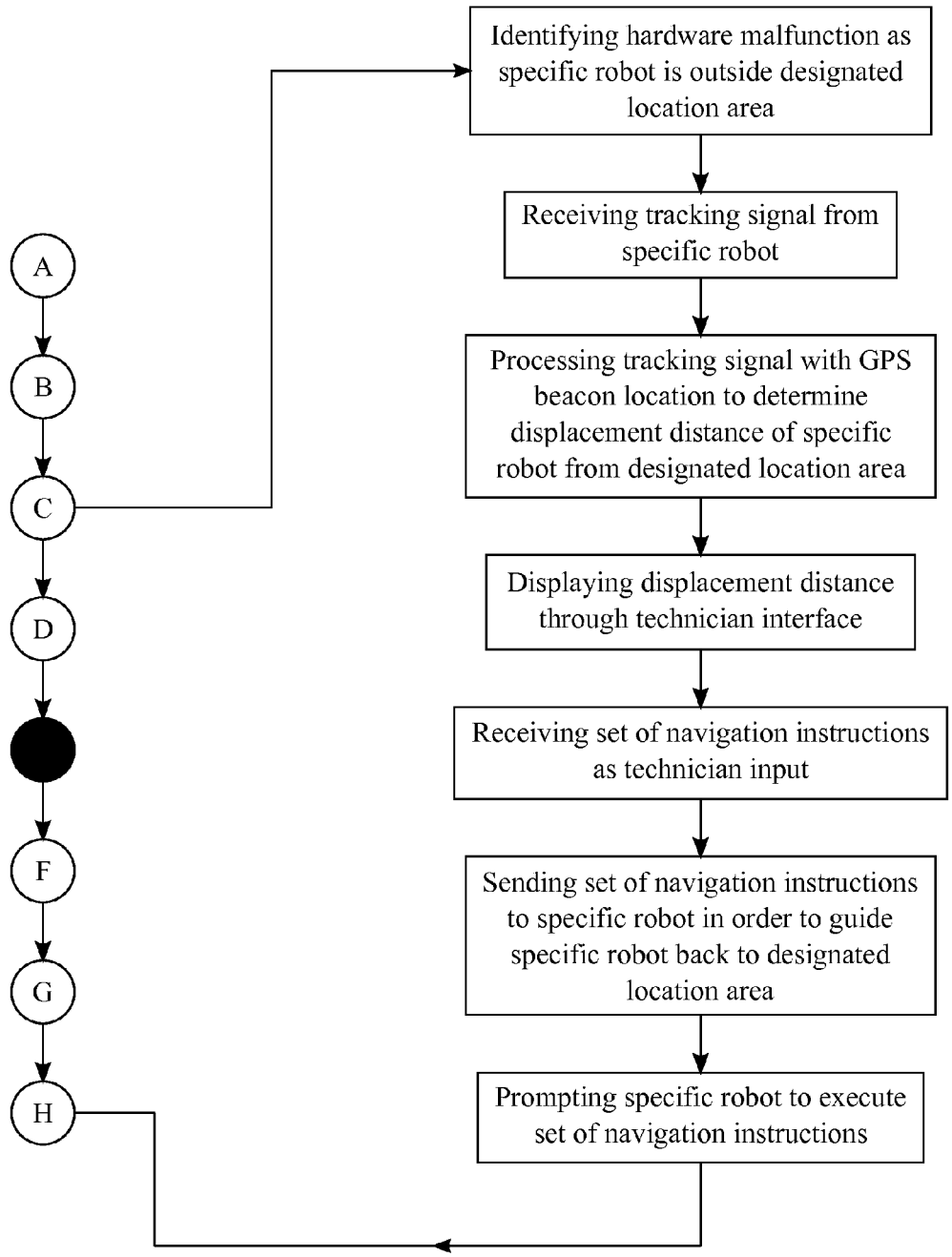
FIG. 9A is a flow chart illustrating a specific scenario of the general process, wherein an electro-mechanical robot being outside of its designated location area is considered a hardware malfunction, and the present invention does require technician intervention in order to receive a set of navigation instructions for the electro-mechanical robot.
Figure 9B:
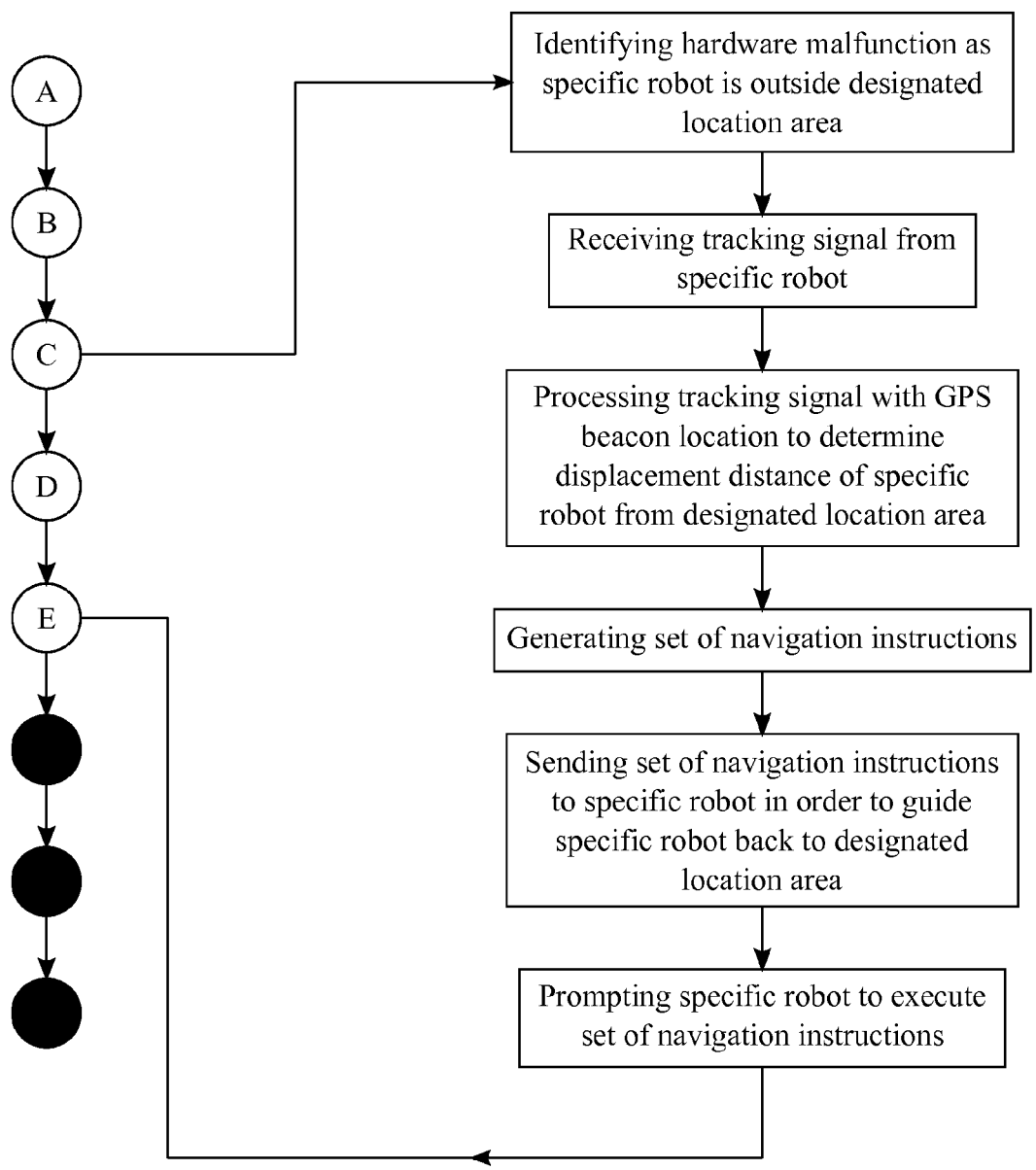
FIG. 9B is a flow chart illustrating a specific scenario of the general process, wherein an electro-mechanical robot being outside of its designated location area is considered a hardware malfunction, and the present invention does not require technician intervention because the present invention is able to generate a set of navigation instructions for the electro-mechanical robot.

As can be seen in FIGS. 9A and 9B, another specific scenario of the general process can occur when a hardware malfunction as the specific robot is outside of its designated location area, which is the location where the specific robot is supposed to be operating and performing its typical functions. For example, an electro-mechanical robot that is used in manufacturing would have a designated location area along a manufacturing assembly line. The software application is able to identify the hardware malfunction as the specific robot is outside of its designated location area by using a GPS beacon locator, which is available as one of the CARR applications. The software application will receive a tracking signal from the specific robot and will process the tracking signal with the GPS beacon locator in order to determine the distance of the specific robot from its designated location area. As can be seen in FIG. 9A, if the optimal AI Algorithm does require technician intervention, then the software application will display a displacement distance of the specific robot from its designated location area through the technician interface so that the technician can view how far out of place the specific robot is. Once the technician views the displacement distance of the specific robot, the technician can enter a set of navigation instructions through the technician interface. The set of navigation instructions describes how to guide the specific robot back to its designated location area. In this case, the software application receives the set of navigation instructions as the technician input. As can be alternatively seen in FIG. 9B, if the optimal AI algorithm does not require technician intervention, then the software application would need to generate the set of navigation instructions. Finally, the software application will send the set of navigation instructions to the specific robot and will prompt the specific robot to execute the set of navigation instructions so that the specific robot can return to its designated location area.

In some embodiments, the present invention will be used to monitor sensors calibration. Typically, sensors to be monitored include, but is not limited to, the following types: proprioceptive sensors, exteroceptive sensors, ambient energy, temperature probes, microphones, charge-coupled device (CCD), complementary metal oxide semiconductor (CMOS) cameras, laser range finders, ultrasonic sensors, character sensor performance, bandwidth of frequency speed sensor, sensitivity sensor, sonar sensor, heading sensors, compasses, gyroaris, micro-electro-mechanical systems, inertial measurement unit, internal navigation system, vehicle onboard radar (VORAD), internal orientation of CCD, detector length and focal length, GPS, and the dispersal cone of the transmittal beam. In addition, the present invention could be used to monitor the following types of algorithms: parallel tracking and mapping; sum of absolute differences; sum of squared distance; normalized cross correlation; research epipolar rectification algorithm; structure from motion; singular valves decomposition; feature from accelerated segment test; scale invariant feature transform; maximally stable external regions; speeded up robust features; graphics processing units; field programmable gate array; random sample consensus; Hough transform; expectation maximization; clustering; line extraction; navigation; localization; cognition; motion control; lighter than air; heavier than air; vertical takeoff and landing; sensor noise; picture jitter errors; and confidence or probability parameter.

In some embodiments, neural programming algorithms integration shall apply diagnostics for AI algorithms. Neural programming shall supplement for intrusive detection security. The Manhattan algorithm shall assist for autonomous robots to find the correct locality in correlation with GPS. The Hill-Climbing algorithms shall find the shortest algorithms, strands, nodes, decipher cross language stacks, data selection, and provide the correct CARR applications for repair. Back propagation shall enact as a backup for required algorithms. The artificial neural network shall have required CARR applications, multilevel perception, and over-learning generalization shall be implemented to reduce errors. The K-nearest neighbors shall be used to utilize the most efficient amount of space. Hierarchical temporal memory shall be used to integrate with the utilized input for control of machine.

Although the invention has been explained in relation to its preferred embodiment, it is to be understood that many other possible modifications and variations can be made without departing from the spirit and scope of the invention as hereinafter claimed.

What is claimed is:

1. A method of managing a collection of robot repairing resources by executing computer-executable instructions stored on a non-transitory computer-readable medium, the method comprising:
providing a plurality of electro-mechanical robots;
providing a plurality of robot repairing manuals, a plurality of artificial intelligence (AI) algorithms, and a plurality of cloud accessible robot repairing (CARR) applications;
monitoring hardware diagnostic information and software diagnostic information from each of the electro-mechanical robots;
detecting a hardware malfunction or a software malfunction within a specific robot, wherein the specific robot is one of the electro-mechanical robots;
identifying the hardware malfunction or the software malfunction by analyzing the hardware diagnostic information and the software diagnostic information with the robot repairing manuals;
selecting at least one optimal AI algorithm and accessing a set of corresponding CARR applications for the optimal AI algorithm in order to repair the hardware malfunction or the software malfunction, wherein the optimal AI algorithm is one of the plurality of AI algorithms and the set of corresponding CARR applications is from the plurality of CARR applications;

implementing the optimal AI algorithm with the corresponding CARR applications on the specific robot, if the optimal AI algorithm does not require technician intervention;

sending a notification alert for the hardware malfunction or the software malfunction through a technician interface and enabling access to the corresponding CARR applications through the technician interface, if the optimal AI algorithm does require technician intervention;

receiving technician input through the technician interface, if the optimal AI algorithm does require technician intervention;

prompting to implement the optimal AI algorithm with both the corresponding CARR applications and the technician input through the technician interface;

providing a mechanical components library as one of the CARR applications;

identifying the hardware malfunction as a malfunction within a mechanical system of the specific robot;

receiving the technician input as an acknowledgement to build a replacement mechanical part, if the optimal AI algorithm recommends repairing the hardware malfunction with the replacement mechanical part;

retrieving specifications for the replacement mechanical part from the mechanical components library;

sending the specifications for the replacement mechanical part to a three-dimensional printer;

the mechanical system being a pneumatic system; and providing pressure probes within the specific robot to monitor the pneumatic system.

2. The method as claimed in claim 1 comprising:
providing an electronic components library as one of the CARR applications;
identifying the hardware malfunction as a malfunction within an electrical system of the specific robot;
receiving the technician input as an acknowledgement to build a replacement electronic part, if the optimal AI algorithm recommends repairing the hardware malfunction with the replacement electronic part;
retrieving specifications for the replacement electronic part from the electronic components library; and
sending the specifications for the replacement electronic part to a three-dimensional printer.

3. The method as claimed in claim 1 comprising:
each of the electro-mechanical robots comprising a robotic operating system (ROS);
collecting backup data for the ROS of the specific robot as one of the CARR applications;
identifying the software malfunction as an error within the ROS of the specific robot; and
resetting the ROS of the specific robot with the backup data.

4. The method as claimed in claim 3 comprising:
receiving the technician input as an acknowledgement to reset the ROS with the backup data for the specific robot,
if the optimal AI algorithm recommends repairing the software malfunction with the backup data and if the optimal AI algorithm does require technician intervention.

5. The method as claimed in claim 3 comprising:
automatically resetting the ROS of the specific robot with the backup data,
if the optimal AI algorithm recommends repairing the software malfunction with the backup data and if the optimal AI algorithm does not require technician intervention.

6. The method as claimed in claim 1 comprising:
each of the electro-mechanical robots comprising an ROS;
retrieving a data patch for the ROS of the specific robot as one of the CARR applications;
identifying the software malfunction as an error within the (ROS) of the specific robot; and
reformatting the ROS of the specific robot with the data patch.

7. The method as claimed in claim 6 comprising:
receiving the technician input as an acknowledgement to reformat the ROS with the data patch for the specific robot,
if the optimal AI algorithm recommends repairing the software malfunction with the data patch and if the optimal AI algorithm does require technician intervention.

8. The method as claimed in claim 6 comprising:
automatically reformatting the ROS of the specific robot with the data patch,
if the optimal AI algorithm recommends repairing the software malfunction with the data patch and if the optimal AI algorithm does not require technician intervention.

9. The method as claimed in claim 1 comprising:
each of the electro-mechanical robots comprising an ROS;
providing transport layer security, antivirus protection, and intrusive detection security as three of the CARR applications;
identifying the software malfunction as potential software vulnerabilities within the ROS of the specific robot;
firewalling the ROS of the specific robot with the transport security layer;
monitoring the ROS of the specific robot with the antivirus protection; and
preventing external access to the ROS of the specific robot with the intrusive detection security.

10. The method as claimed in claim 1 comprising:
each of the electro-mechanical robots comprising a portable power source;
providing a power level monitoring system as one of the CARR applications;
identifying the hardware malfunction as a critically low power level within the portable power source of the specific robot; and
prompting to recharge or replace the portable power source of the specific robot through the technician interface.

11. The method as claimed in claim 1 comprising:
providing a global positioning system (GPS) beacon locator as one of the CARR applications;
identifying the hardware malfunction as the specific robot is outside of a designated location area;
receiving a tracking signal from the specific robot;

processing the tracking signal with the GPS beacon locator in order to determine a displacement distance of the specific robot from the designated location area;

sending a set of navigation instructions to the specific robot in order to guide the specific robot back to the designated location area; and prompting the specific robot to execute the set of navigation instructions.

12. The method as claimed in claim 11 comprising:

displaying the displacement distance through the technician interface, if the optimal AI algorithm does require technician intervention; and receiving the set of navigation instructions as the technician input, if the optimal AI algorithm does require technician intervention.

13. The method as claimed in claim 11 comprises the step of:

generating the set of navigation instructions, if the optimal AI algorithm does not require technician intervention.

\* \* \* \* \*